United States Patent
Grung et al.

(10) Patent No.: US 6,821,029 B1
(45) Date of Patent: Nov. 23, 2004

(54) HIGH SPEED SERIAL I/O TECHNOLOGY USING AN OPTICAL LINK

(75) Inventors: Bernard L. Grung, Eden Prairie, MN (US); Wayne L. Walters, Prior Lake, MN (US); Steven M. Baier, Minnetonka, MN (US)

(73) Assignee: Xilinx, Inc., San Jose, CA (US)

( * ) Notice: Subject to any disclaimer, the term of this patent is extended or adjusted under 35 U.S.C. 154(b) by 177 days.

(21) Appl. No.: 10/241,289

(22) Filed: Sep. 10, 2002

(51) Int. Cl.[7] .................. G02B 6/36; H04B 17/00; H01L 21/00
(52) U.S. Cl. ................. 385/92; 385/88; 438/31; 438/32; 398/22; 398/140; 398/141
(58) Field of Search .................. 385/88, 92; 438/31, 438/32; 398/22, 140, 141

(56) References Cited

U.S. PATENT DOCUMENTS 6,368,930 B1    4/2002   Enquist ................... 438/320

2002/0118412 A1 * 8/2002 Gibson et al. .............. 359/118

* cited by examiner

Primary Examiner—Brian Healy
Assistant Examiner—Tina M Lin
(74) Attorney, Agent, or Firm—John Kubodera

(57) ABSTRACT

A high-speed optical transceiver for an integrated circuit (IC) includes a serializer-deserializer (SERDES) and a vertical cavity surface emitting laser (VCSEL) combined with a detector array. By covalently bonding the SERDES die to the IC, the two components can be processed simultaneously to produce a tightly aligned, high-speed data interface. The SERDES can be coupled to the VCSEL/detector array using a flex interconnect, or the VCSEL/detector array can also be covalently bonded to the IC or SERDES to maximize data bandwidth. The SERDES and VCSEL/detector array can also be produced in a single die using a process technology appropriate for both to maximize manufacturing efficiency.

45 Claims, 9 Drawing Sheets

HIGH SPEED SERIAL I/O TECHNOLOGY USING AN OPTICAL LINK

BACKGROUND OF THE INVENTION

1. Field of the Invention

The invention relates to serial communications between electronic components, and more particularly to a high-speed optical communications link.

2. Discussion of Related Art

As the bandwidth requirements of modern microprocessors and other electronic devices continue to increase, the need for a high-speed, low-noise communications technique becomes more and more important. In the near future, data transfer rates in excess of 40 Gb/s will be required to keep up with the faster CPU clock speeds. However, conventional data communications technologies have a limited bandwidth capability. FIG. 1a shows a conventional printed circuit board (PCB) 100a, which comprises an integrated circuit (IC) 120 mounted on a board 110 (typically made from FR4). A copper trace 111 printed on board 110 routes signals to and from IC 120. PCB 100a is installed in a socket 191 of a backplane 190. Copper trace 111 interfaces with socket 191, thereby allowing IC 120 to communicate with other ICs (not shown) mounted on other PCBs (not shown) connected to backplane 190.

Copper traces on a board (such as an FR4 substrate) provide a well-known and well-characterized means for carrying data between ICs. Unfortunately, the data links provided by such traces are highly susceptible to signal degradation at higher bandwidths. Typically, a copper trace on an FR4 board can sustain at most a 2 GHz signal—anything greater results in excessive noise and signal attenuation. Increasing the number of traces to create a wider data path can provide some overall bandwidth improvement, but board area restrictions, EMI effects, and data synchronizing issues can reduce the effectiveness of this type of parallel bus structure.

To overcome these bandwidth limitations, an optical fiber can be used in place of copper traces. Because of the high bandwidth and low noise characteristics of optical fiber, the parallel data bus architecture formed by copper traces can be replaced by a serial architecture using an optical link. FIG. 1b shows an electronics package 100b that includes an IC 120 mounted on a board 110, similar to PCB 100a shown in FIG. 1a. However, instead of copper traces, electronics package 100b includes a serializer/deserializer (SERDES) 130 connected to IC 120 via a flex interconnect 131. SERDES 130 converts outgoing parallel data into serial form, and converts incoming serial data into parallel form. A combination vertical cavity surface emitting laser (VCSEL) and detector array 140 is connected to SERDES 130 via solder bumps 141 (flip-chip or ball-grid-array (BGA) connection). A connector 150, attached to VCSEL/detector array 140, mates an optical fiber 151 to VCSEL/detector array 140, thereby providing an optical data link for high-speed communications.

However, while optical fiber 151 can carry data at well over 40 Gb/s, flex interconnect 131 creates a bottleneck for data flow to and from IC 120. Although optimized for high-speed data transmission, typical flex interconnects (such as those manufactured by MicroConnex Corp. and Flex Interconnect Technologies) still cannot sustain a data rate of much greater than 10 Gb/s. Ideally, SERDES 130 and VCSEL/detector array 140 would be formed in the same die as IC 120, thereby eliminating the need for flex interconnect 131. However, performance requirements for the individual components generally preclude the formation of IC 120, SERDES 130, and VCSEL/detector array 140 using a single process. For example, IC 120 would typically be produced using a silicon CMOS process to make use of high-speed digital devices. However, SERDES 130 would generally be formed in a silicon germanium (SiGe) biCMOS process to meet the high-drive requirements of the SERDES devices. And finally, VCSEL/detector array 140 is typically produced by a gallium arsenide (GaAs) process, due to the direct bandgap that optimizes the process for optical applications. Thus, combining IC 120, SERDES 130, and VCSEL/detector array 140 into a single die using a single process would generally degrade the performance of one or more of those components, thereby eliminating any benefit achieved from elimination of the flex interconnect.

However, even with the transmission bottleneck caused by flex interconnect 131, electronics package 100b still provides a significant increase in data bandwidth over conventional copper trace systems. Unfortunately, manufacturing electronics package 100b can be extremely expensive because each die (IC120, SERDES 130, and VCSEL/detector array 140) must be produced separately and then assembled into a single PCB. This type of "package-level" integration is generally much more costly than a "die-level" integration due to the manual assembly operations required. Particularly problematic is the flip-chip or BGA connection between SERDES 130 and VCSEL/detector array 140. Although solder bumps 141 provide a fast electrical connection between SERDES 130 and VCSEL/detector array 140, accurate alignment and secure attachment of the two dies can require high-precision packaging tooling, which in turn can significantly increase the final cost of electronics package 100b.

Accordingly, it is desirable to provide an optical transceiver (transmitter/receiver) for an IC that provides high data bandwidth while at the same time minimizing package-level integration operations.

SUMMARY

The invention provides a high-speed optical transceiver for an IC by integrating optical transceiver components with the IC at the die level, thereby minimizing throughput degradation and simplifying the manufacturing process. According to an embodiment of the invention, a SERDES is attached to an IC using a covalent bonding technique. The covalent bond provides an accurate, high-bandwidth connection between the SERDES and IC. Furthermore, the strong covalent bond allows subsequent planarization and processing operations to be performed on the SERDES (and IC) without fear of damaging any data interconnections.

According to an embodiment of the invention, a flex interconnect can be used to carry data between the SERDES and an opto-electric converter, such as a VCSEL/detector array. The flex interconnect replaces the problematic flip-chip or BGA interface between the SERDES and opto-electric converter found in conventional optical transceiver implementations. Due to its relative ease of alignment and installation, the flex interconnect greatly simplifies the manufacturing process of the optical transceiver. According to an embodiment of the invention, the opto-electric converter can include a fiber connector to allow attachment of an optical fiber for transmission of optical signals. According to another embodiment of the invention, a transparent window is placed adjacent to the opto-electric converter to allow free space transmission of optical signals. According to other embodiments of the invention, the SERDES-IC construction can be installed using a flip-chip configuration to allow more direct contact between the SERDES and flex interconnect.

According to other embodiments of the invention, the opto-electric converter is covalently bonded directly onto the SERDES or directly onto the IC. In either case, all the optical transceiver components are fully integrated with the IC, thereby eliminating the need for a flex interconnect (and its associated bandwidth limitations). Furthermore, by combining the optical transceiver components at the die level, costly package-level manufacturing operations are minimized. A fiber connector or transparent window can be provided at the opto-electric converter to permit optical fiber or free space data link connections, respectively. According to other embodiments of the invention, the opto-electric converter-SERDES-IC construction can be mounted in a flip-chip configuration.

According to another embodiment of the invention, the SERDES and opto-electric converter are formed in a single die. While integration of the IC with the SERDES and opto-electric converter is generally not desirable due to process-related performance degradation, by selecting an appropriate process technology, the SERDES and opto-electric converter can be properly implemented using that single process technology. For example, the SERDES and a VCSEL/detector array can both be produced in a GaAs or InP die. By combining both components into a single die, the manufacturing process is further simplified, as only a single covalent bonding operation is required. Once again, a fiber connector or transparent window can be provided at the VCSEL/detector array to permit optical fiber or free space data link connections, respectively, and a flip-chip installation can be used.

The present invention will be more fully understood in view of the following description and drawings.

DETAILED DESCRIPTION

Figure 2A:
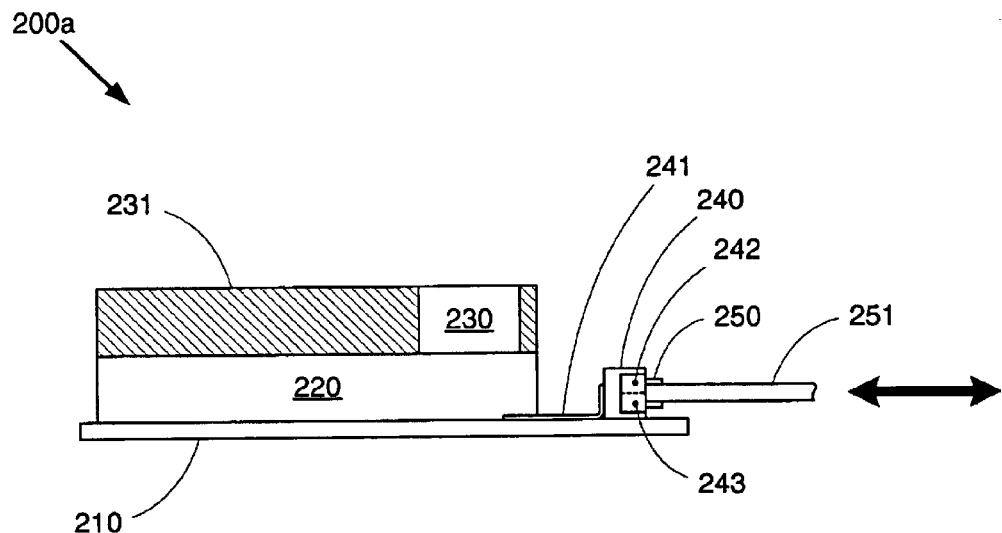
FIGS. 2a–2d show IC assemblies using optical communications links and an integrated SERDES, in accordance with embodiments of the invention.

FIG. 2a shows an IC assembly 200a that incorporates an optical transceiver in accordance with an embodiment of the invention. IC assembly 200a comprises an IC 220 mounted on a support structure 210. IC 220 can comprise any type of IC, such as a field programmable gate array (FPGA), a microprocessor, or a memory module. Support structure 210 can comprise any structure onto which IC 220 can be mounted, including a PCB or a standard chip package. The optical communications capability of IC assembly 200a is provided by a SERDES 230 formed on IC 220 and an opto-electronic converter 240 connected to IC 220 via a flex interconnect 241. Opto-electronic converter 240 converts electrical signals to and from optical signals and therefore includes a transmitter 242 and a receiver 243. Transmitter 242 can comprise any device for providing the electrical-to-optical signal conversion, including a light-emitting diode (LED), a VCSEL, or even a light modulating device. Similarly, receiver 243 can comprise any device for providing the optical-to-electrical signal conversion, such as an avalanche photodetector (APD), a PIN (P-type, insulator, N-type) photodetector, or an MSM-type (metal, semiconductor, metal) photodetector. Transmitter 242 and receiver 243 in opto-electronic converter 240 are typically produced using the same process technology, and are generally positioned in close proximity with one another to enable the use of a single optical signal path. However, it should be noted that the transmitter 242 and receiver 243 could also be two separate elements, as indicated by the dotted line separating the two. A fiber connector 250 on opto-electronic converter 240 mates with an optical fiber 251 to carry optical signals to and from opto-electronic converter 240. Note that optical fiber 251 can carry those optical signals to and from any desired destination, such as another IC, a separate PCB, or even another location within IC assembly 200a.

As mentioned previously, IC 220, SERDES 230, and opto-electronic converter 240 are typically formed using different process technologies to optimize the performance characteristics of each individual component. For example, the high-speed digital devices of an FPGA or microprocessor in IC 220 would generally be produced using the mature CMOS technology of a silicon process. On the other hand, the high-speed and high-drive requirements of SERDES 230 would be better implemented using a group IV material process, such as silicon germanium (SiGe). And the optical requirements of opto-electronic converter 240 will often demand a particular process technology. For example, the incorporation of a laser such as a VCSEL will typically require a group III–V material such as gallium arsenide (GaAs) or indium phosphide (InP). Note, however, that IC 220, SERDES 230, and opto-electronic converter 240 are not limited to the process technologies listed above, but can be produced using any process technology that meets the performance requirements of the particular component being produced.

SERDES 230 is attached to IC 220 using a covalent bonding technique, such as the process described in U.S. Pat. No. 6,368,930, issued Apr. 9, 2002 to Enquist (hereinafter referred to as the "Enquist process"). The covalent bond is formed by creating highly planarized and polished mating surfaces on SERDES 230 and IC 220. The surface molecules on the mating surfaces then bond upon contact to create a durable, high-quality (high-speed) die-level interface between IC 220 and SERDES 230. Typically, the silicon die for IC 220 would be processed up to its first metal layer, at which point the group IV material die (e.g., SiGe) for SERDES 230 would be covalently bonded to that first metal layer. A thick oxide layer 231 is then formed over the SERDES and IC dies, and a subsequent planarization operation produces the "embedded" die configuration depicted in FIG. 2a. The high strength of the covalent bond prevents relative shifting or other interface damage during this planarization process. Note that while a SERDES die to IC metal layer bond simplifies the formation of short (i.e., high bandwidth) vertical interconnects between IC 220 and SERDES 230, SERDES 230 could be bonded to any layer of IC 220. After bonding of the two dies is completed, any remaining processing of IC 220 and SERDES 230 can be performed in the usual manner.

Figure 1A:
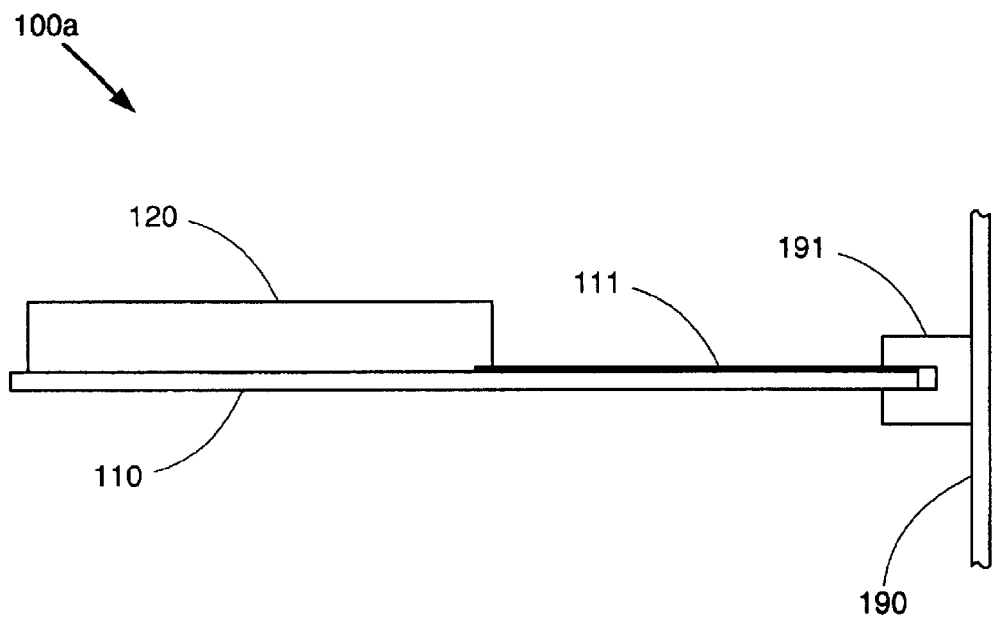
FIG. 1a shows a conventional PCB using copper trace communications technology.
Figure 1B:
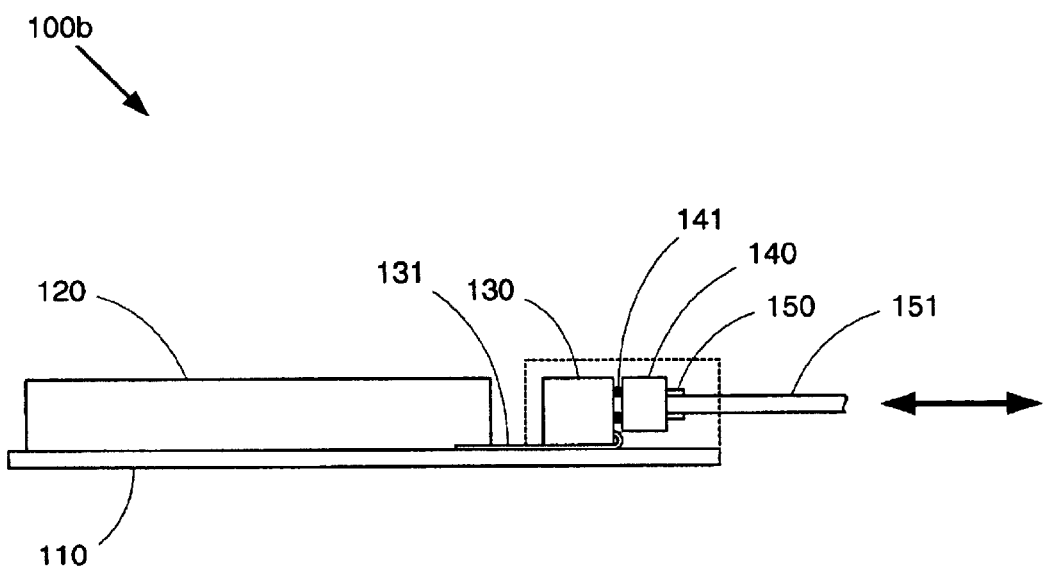
FIG. 1b shows a conventional electronics package using optical fiber communications technology.

To perform a data transmit operation, SERDES 230 converts a parallel stream of data from IC 220 into a serial stream. Flex interconnect 241, electrically connected to SERDES 230 by vias through IC 220 (not shown for clarity), feeds this serial stream of data to opto-electronic converter 240, which then generates a corresponding sequence of optical pulses that can be transmitted via optical fiber 251. To perform a data receive operation, opto-electronic converter 240 reads a serial stream of data from optical fiber 251 and feeds this serial stream to SERDES 230 via flex interconnect 241. SERDES 230 deserializes the incoming data stream, providing the requisite parallel data to IC 220. As noted previously with respect to electronics package 100b shown in FIG. 1b, flex interconnect 241 places a limit on the data bandwidth of IC assembly 200a. However, IC assembly 200a still provides a much higher data bandwidth than a conventional PCB, and the die-level integration of SERDES 230 and IC 220 eliminates the costly SERDES-to-VCSEL/detector array bonding and alignment operation required by conventional electronics package 100b. In this manner, IC assembly 200a provides a relatively high data bandwidth capability in a highly manufacturable assembly.

Optical fiber 251 can comprise any type of optical fiber suitable for carrying the optical signals produced by opto-electronic converter 240. For example, if opto-electronic converter 240 is manufactured using a GaAs process, the resulting laser output will be in the 850–1550 nm range. In such a case, optical fiber 251 could comprise a 50 or 62.5 um glass core with 125 um cladding diameter (such as provided by FiberCore, Inc. or Corning, Inc.) to ensure proper transmission of the optical signals. However, note that the optical signals generated by opto-electronic converter 240 need not be transmitted by an optical fiber.

Figure 2B:
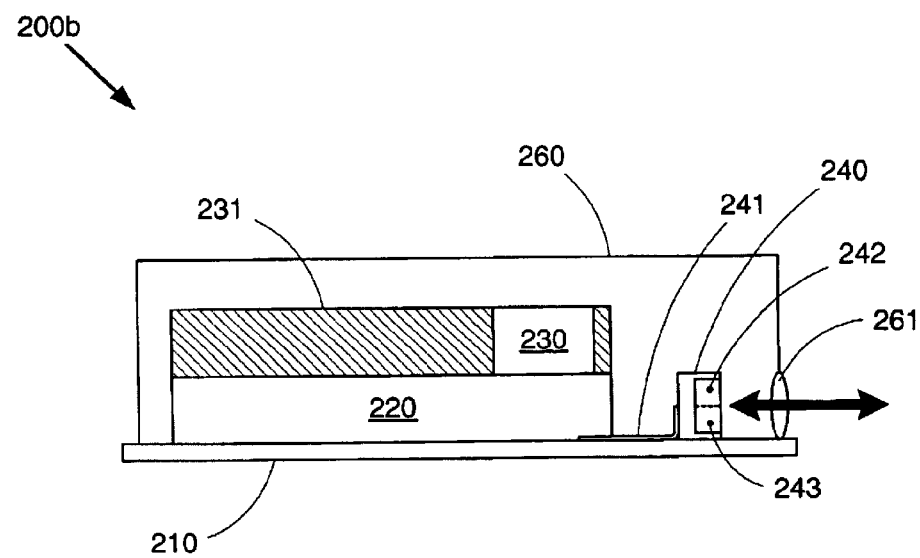

For example, FIG. 2b shows an IC assembly 200b that incorporates an optical transceiver in accordance with another embodiment of the invention. IC assembly 200b is substantially similar to IC assembly 200a shown in FIG. 2a. However, rather than a fiber connector for an optical fiber, IC assembly 200b includes an enclosure 260 that includes a transparent window 261. Window 261 is aligned with opto-electronic converter 240, and allows optical signals to be passed to and from opto-electronic converter 240 through free space. This type of free space optical data link does not provide the contained and controlled transmission path of an optical fiber. However, by eliminating the optical fiber, the free space optical transceiver shown in FIG. 2a can often simplify assembly of components in close proximity with one another.

Figure 2C:
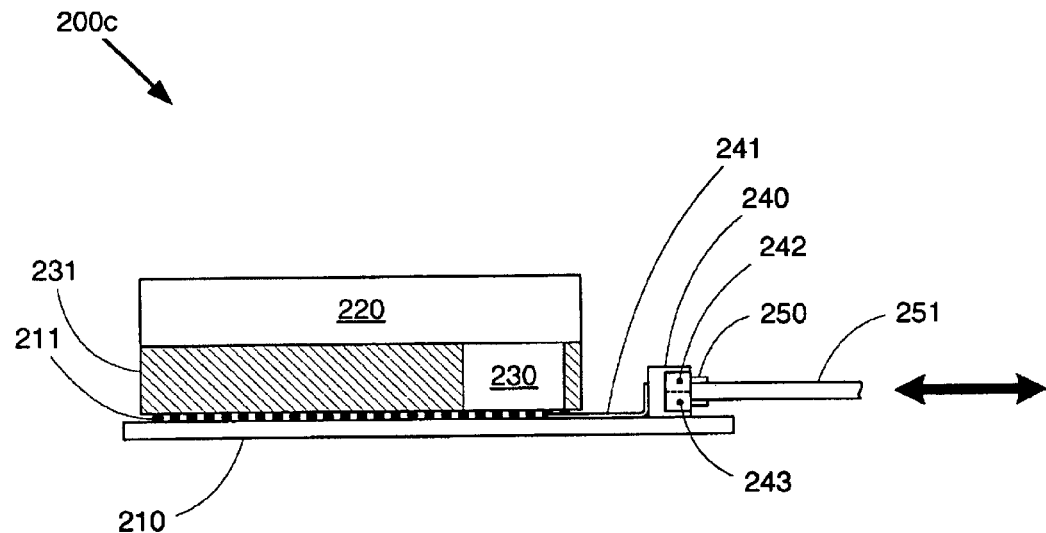

As described previously, the electrical connection between SERDES 230 and flex interconnect 241 of IC assembly 200a (and 200b) is provided by vias formed through IC 220. Since IC 220 is generally formed on a thick substrate (such as a wafer), these vias can be somewhat difficult to produce. To avoid the complexity of such "through-wafer vias", the layered SERDES 230 and IC 220 can be mounted to support structure 210 using a flip-chip technique. FIG. 2c shows an IC assembly 200c that incorporates an optical transceiver in accordance with another embodiment of the invention. IC assembly 200c is substantially similar to IC assembly 200a shown in FIG. 2a, with SERDES 230 covalently bonded to IC 220 and data being carried between SERDES 230 and opto-electronic converter 240 by flex interconnect 241. Also, optical fiber 251 is coupled to opto-electronic converter 240 via connector 250. However, unlike IC assembly 200a of FIG. 2a, the SERDES 230 and IC 220 layered combination of IC assembly 200c is "flipped" and installed onto support structure 210 via solder balls 211 in a flip-chip or ball-grid array (BGA) configuration. In this manner, a direct electrical connection can be made between SERDES 230 and flex interconnect 241, thereby avoiding any difficulties associated with through-wafer vias.

Figure 2D:
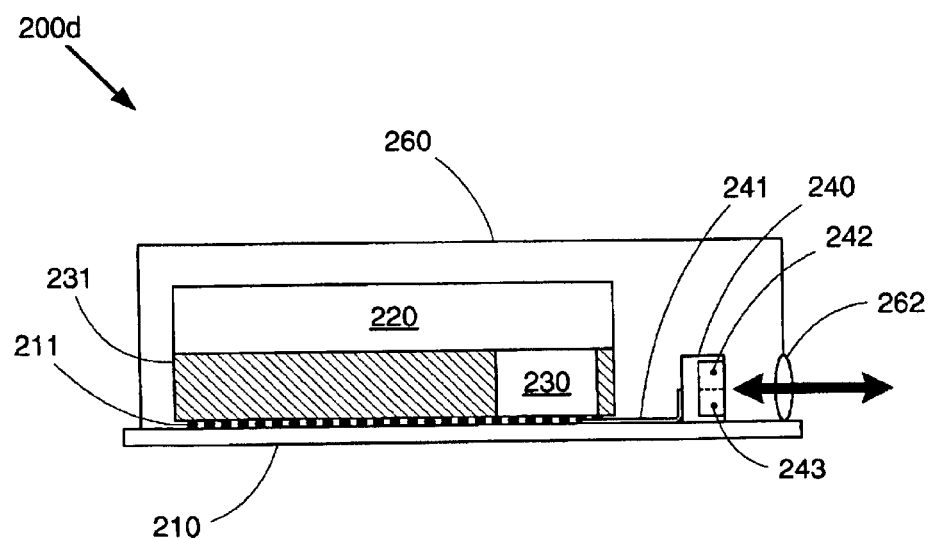

The flip-chip construction used in IC assembly 200c can also be used for a free space optical link configuration. FIG. 2d shows an IC assembly 200d that incorporates an optical transceiver in accordance with another embodiment of the invention. IC assembly 200d is substantially similar to IC assembly 200b shown in FIG. 2b, once again with SERDES 230 covalently bonded to IC 220 and data being carried between SERDES 230 and opto-electronic converter 240 by flex interconnect 241. Also, enclosure 260 includes a transparent window 262 that allows optical signals to be transmitted to and from opto-electronic converter 240. However, unlike IC assembly 200b of FIG. 2b, the SERDES 230 and IC 220 layered combination of IC assembly 200d is "flipped" and installed onto support structure 210 via solder balls 211 in a flip-chip configuration to avoid any difficulties associated with through-wafer vias.

Figure 3A:
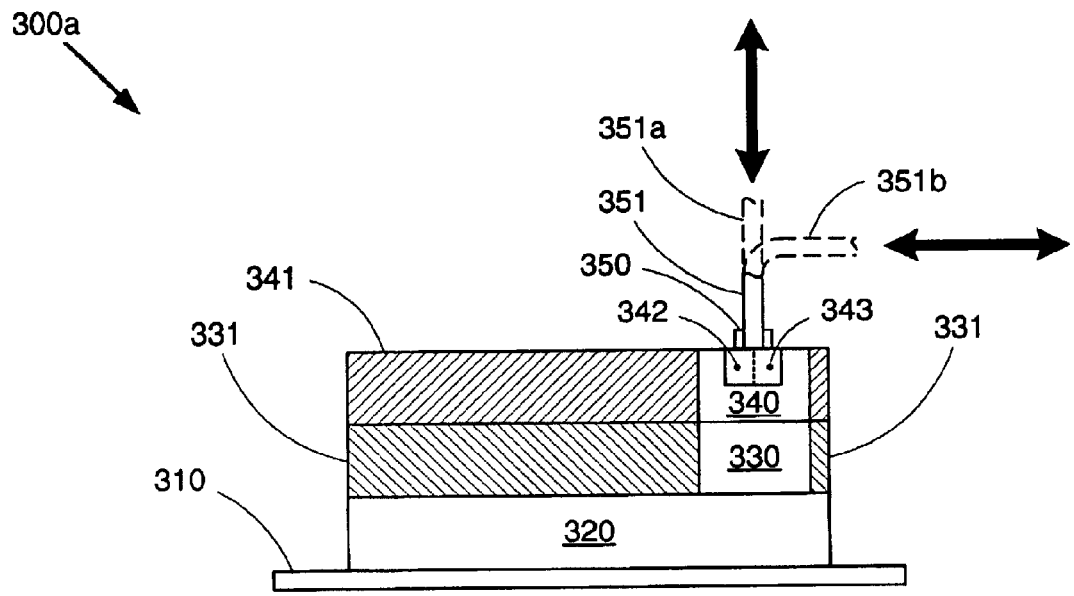
FIGS. 3a–3d, 4a–4d, and 5a–5d show IC assemblies using optical communications links and integrated SERDES and VCSEL/detector arrays, in accordance with embodiments of the present invention.

FIG. 3a shows an IC assembly 300a that incorporates an optical transceiver in accordance with another embodiment of the invention. IC assembly 300a comprises an IC 320 mounted on a support structure 310. IC 320 can comprise any type of IC, such as a field programmable gate array (FPGA), a microprocessor, or a memory circuit. Support structure 310 can comprise any structure onto which IC 320 can be mounted, including a PCB or a standard chip package. IC assembly 300a further comprises a SERDES 330 formed on IC 320 and an opto-electronic converter 340 formed on SERDES 320. A fiber connector 350 on opto-electronic converter 340 mates with an optical fiber 351 to carry optical signals between opto-electronic converter 340 and any desired location.

As described previously with respect to FIG. 2a, IC 320, SERDES 330, and opto-electronic converter 340 of IC assembly 300a are typically formed using different process technologies—for example, a silicon process for IC 320, a group IV material process, such as SiGe, for SERDES 320, and a group III-V process for opto-electronic converter 340. Note once again that IC 320, SERDES 330, and opto-electronic converter 340 are not limited to the process technologies listed above, but can be produced using any process technology that meets the performance requirements of the particular component being produced. Note further that optical fiber 351 can comprise any material having the proper transmission characteristics for the optical signals produced by opto-electronic converter 340.

Like IC assembly 200a shown in FIG. 2a, SERDES 330 of IC assembly 300a is covalently bonded to IC 320 and surrounded with an oxide layer 331 using the covalent bonding technique. However, unlike IC assembly 200a, opto-electronic converter 340 of IC assembly 300a is then bonded directly to SERDES 330 and surrounded with a second oxide layer 341 using the same covalent bonding technique. By "stacking" the IC, SERDES, and opto-electronic converter dies in this manner, vertical interconnects can be used provide high-bandwidth data links between opto-electronic converter 340, SERDES 330, and IC 320. Because SERDES 330 and opto-electronic converter 340 are now directly connected at the die-level, the data bandwidth of IC assembly 300a is not subject to any flex interconnect bandwidth limitations.

To perform a data transmit operation, SERDES 330 converts a parallel stream of data from IC 320 into a serial stream and feeds this serial stream of data directly to opto-electronic converter 340. A transmitter 342 (which can comprise any device for converting electrical signals into optical signals) in opto-electronic converter 340 then generates a corresponding sequence of optical pulses that can be transmitted via optical fiber 351. Note that the flexibility of optical fiber 351 allows it to carry these optical pulses away from opto-electronic converter 340 in any direction, as indicated by sample optical fiber profiles 351a (vertical direction) and 351b (horizontal direction). To perform a data receive operation, a receiver 343 (which can comprise any device for converting optical signals into electrical signals) in opto-electronic converter 340 reads a serial stream of data from optical fiber 351 and feeds this serial stream directly to SERDES 330. SERDES 330 deserializes the incoming data stream, providing the requisite parallel data to IC 320.

As noted previously, because IC assembly 300a does not include any flex interconnect, the full bandwidth of optical fiber 351 can be used. Furthermore, because the covalent bonding operations are performed at the die level, the alignment of opto-electronic converter 340 and SERDES 330 can be performed much more easily and with much greater accuracy than would be possible with conventional flip-chip bonding techniques. In this manner, IC assembly 300a provides high bandwidth (>40 Gb/s) capability in a highly manufacturable assembly.

Figure 3B:
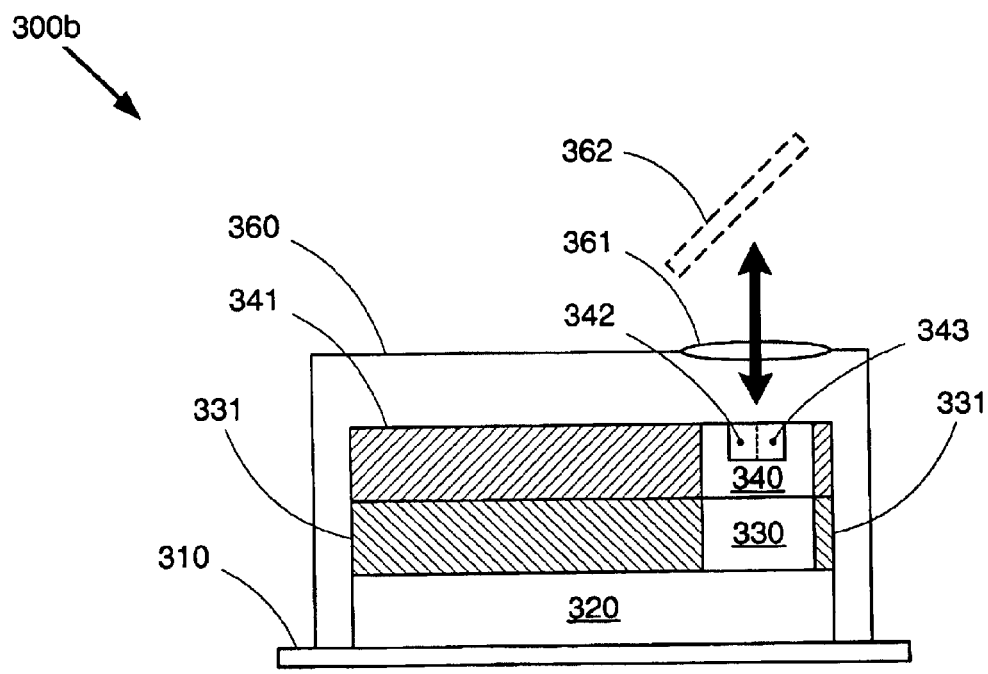

FIG. 3b shows an IC assembly 300b that incorporates an optical transceiver in accordance with another embodiment of the invention. IC assembly 300b is substantially similar to IC assembly 300a shown in FIG. 3a, comprising an IC 320 mounted on a support structure 310, a SERDES 330 bonded to IC 320, and a opto-electronic converter 340 bonded to SERDES 330. As in IC assembly 300a, SERDES 330 of IC assembly 300b is bonded to IC 320 and surrounded by an oxide layer 331 using the covalent bonding technique, and opto-electronic converter 340 is bonded to SERDES 330 and surrounded with an oxide layer 341 using the covalent bonding technique. However, rather than a fiber connector for an optical fiber, IC assembly 300b includes an enclosure 360 that includes a transparent window 361. Window 361 is aligned with opto-electronic converter 340, and allows optical signals to be passed to and from a transmitter 342 and a receiver 343, respectively, in opto-electronic converter 340, thereby providing a free space optical data link. An optional reflector 362 can be used to control the direction of the actual data path.

Figure 3C:
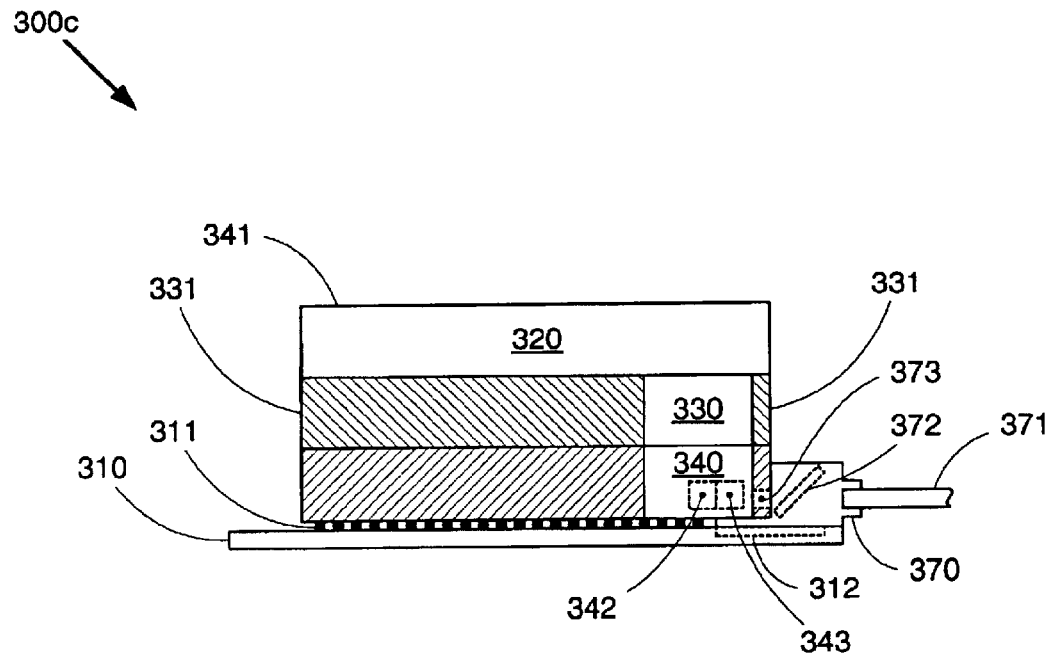

The flip-chip installation technique described with respect to FIGS. 2c and 2d can also be applied to the multi-layer constructions described with respect to IC assemblies 300a and 300b shown in FIGS. 3a and 3b, respectively. For example, FIG. 3c shows an IC assembly 300c that incorporates an optical transceiver in accordance with another embodiment of the invention. IC assembly 300c is substantially similar to IC assembly 300a shown in FIG. 3a, with SERDES 330 covalently bonded to IC 320 and opto-electronic converter 340 covalently bonded to SERDES 330. However, unlike IC assembly 300a of FIG. 3a, the layered construction of opto-electronic converter 340, SERDES 330 and IC 320 is flipped and installed onto support structure 310 via a plurality of solder balls 311 in a flip-chip configuration. IC assembly 300c also includes a fiber connector 370 that mates with optical fiber 371 to carry optical signals to and from IC assembly 300c. Depending on the positioning and interface requirements for transmitter 342 and receiver 343 in opto-electronic converter 340, the interface to fiber connector 370 can take a variety of forms. For example, an optional direct pathway 373 can be provided between incoming optical fiber 371 and opto-electronic converter 340. Alternatively, if transmitter 342 and receiver 343 are surface-based (e.g., as in a VCSEL), fiber connector 370 can include optional focusing optics 372 to properly direct the optical signals between opto-electronic converter 340 and optical fiber 371. An optional waveguide 312 mounted in support structure 310 can provide additional means for optical signal transmission.

Figure 3D:
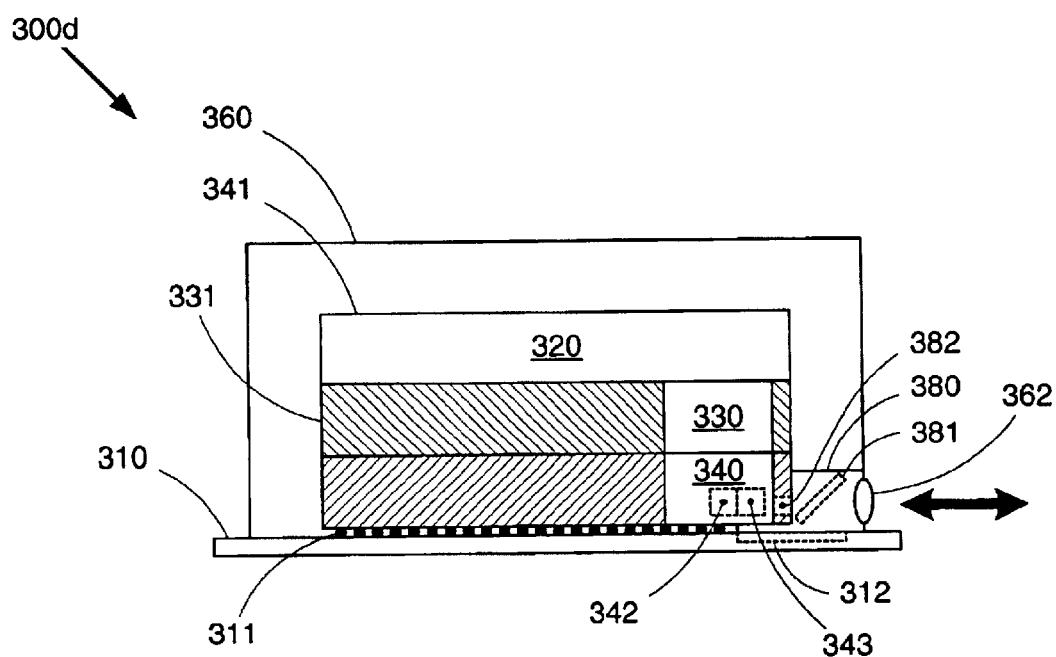

Similarly, the flip-chip construction can be applied to a free space optical link configuration. FIG. 3d shows an IC assembly 300d that incorporates an optical transceiver in accordance with another embodiment of the invention. IC assembly 300d is substantially similar to IC assembly 300b shown in FIG. 3b, once again with SERDES 330 covalently bonded to IC 320 and opto-electronic converter 340 covalently bonded to SERDES 330. However, unlike IC assembly 300b of FIG. 3b, the layered construction of opto-electronic converter 340, SERDES 330 and IC 320 is flipped and installed onto support structure 310 via a plurality of solder balls 311 in a flip-chip configuration. A transparent window 362 in enclosure 360 once again allows free space optical signals to be transmitted to and from IC assembly 300d, but because of the new orientation of opto-electronic converter 340 (as compared to IC assembly 300b in FIG. 3b), IC assembly 300d includes a transmission module 380 to ensure that those free space optical signals are properly conveyed to and from opto-electronic converter 340. Once again, depending on the technology and positioning of transmitter 342 and receiver 343 in opto-electronic converter 340, transmission module 380 can take a variety of forms. For example, an optional direct pathway 382 can be provided to opto-electronic converter 340. Alternatively, if the transmitter 342 and receiver 343 are surface-based (e.g., as in a VCSEL), transmission module 380 can include optional focusing optics 381 to properly direct the optical signals to and from opto-electronic converter 340. An optional optical waveguide 312 mounted in support structure 310 can provide additional means for optical signal transmission.

Figure 4A:
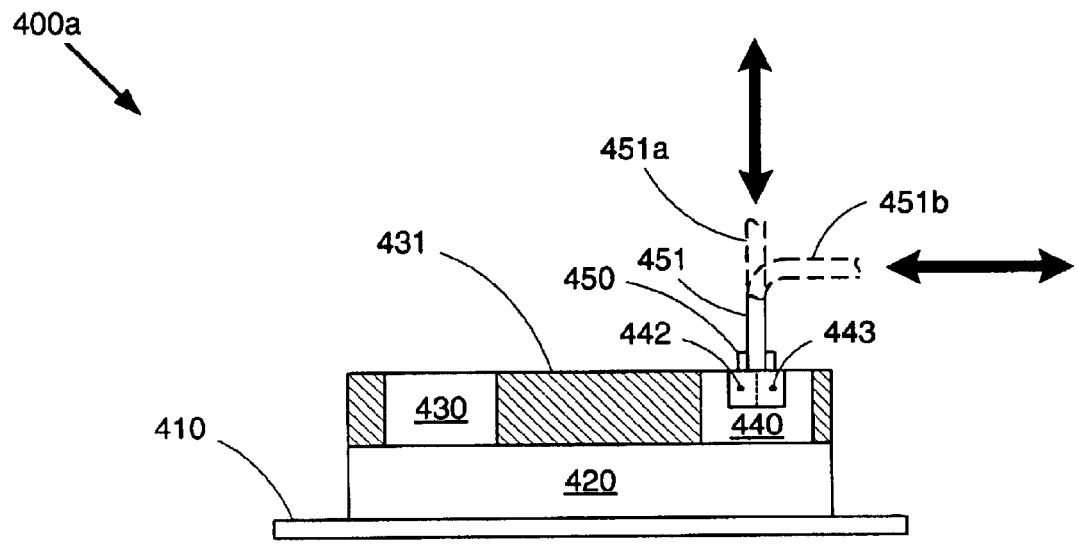

FIG. 4a shows an IC assembly 400a that incorporates an optical transceiver in accordance with another embodiment of the invention. IC assembly 400a comprises an IC 420 mounted on a support structure 410. IC 420 can comprise any type of IC, such as a field programmable gate array (FPGA), a microprocessor, or a memory circuit. Support structure 410 can comprise any structure onto which IC 420 can be mounted, including a PCB or a standard chip package. IC assembly 400a further comprises a SERDES 430 formed on IC 420 and an opto-electronic converter 440 formed on IC 420. Like opto-electronic converter 340 shown in FIG. 3a, opto-electronic converter 440 includes a transmitter 442 for converting electrical signals into optical signals and a receiver 443 for converting optical signals into electrical signals. A fiber connector 450 on opto-electronic converter 440 mates with an optical fiber 451 to carry optical signals between opto-electronic converter 440 and any desired location.

As in IC assembly 300a shown in FIG. 3a, SERDES 430 and opto-electronic converter 440 of IC assembly 400a are both bonded using the covalent technique to IC 420 to achieve maximum data bandwidth. However, instead of the stacked configuration shown in FIG. 3a, SERDES 430 and opto-electronic converter 440 are arranged in a side-by-side configuration. This side-by-side placement can simplify the manufacturing process for IC assembly 420, as formation of thick oxide layer 431 would only require a single oxidation and planarization sequence.

Aside from the arrangement of SERDES 430 and opto-electronic converter 440, the construction and operation of IC assembly 400a is substantially similar to that of IC assembly 300a shown in FIG. 3a. For example, a silicon process can be used to create IC 420, a group IV material process, such as SiGe, could be used for SERDES 420, and a group III-V process for opto-electronic converter 440. Note once again that other process technologies could be used. Also note that optical fiber 451 can comprise any material having the proper transmission characteristics for the optical signals produced by opto-electronic converter 440.

To perform a data transmit operation, SERDES 430 converts a parallel stream of data from IC 420 into a serial stream and feeds this serial stream of data directly to opto-electronic converter 440. Transmitter 442 then generates a corresponding sequence of optical pulses that can be transmitted via optical fiber 451. As described with respect to FIG. 3a, the flexibility of optical fiber 451 allows for customized routing of the optical signals from opto-electronic converter 440. To perform a data receive operation, receiver 443 reads a serial stream of data from optical fiber 451 and feeds this serial stream directly to SERDES 430. SERDES 430 deserializes the incoming data stream, thereby providing the requisite parallel data to IC 420. Thus, IC assembly 400a includes a highly manufacturable, high-speed optical transceiver, unrestrained by any flex interconnect data bottleneck.

Figure 4B:
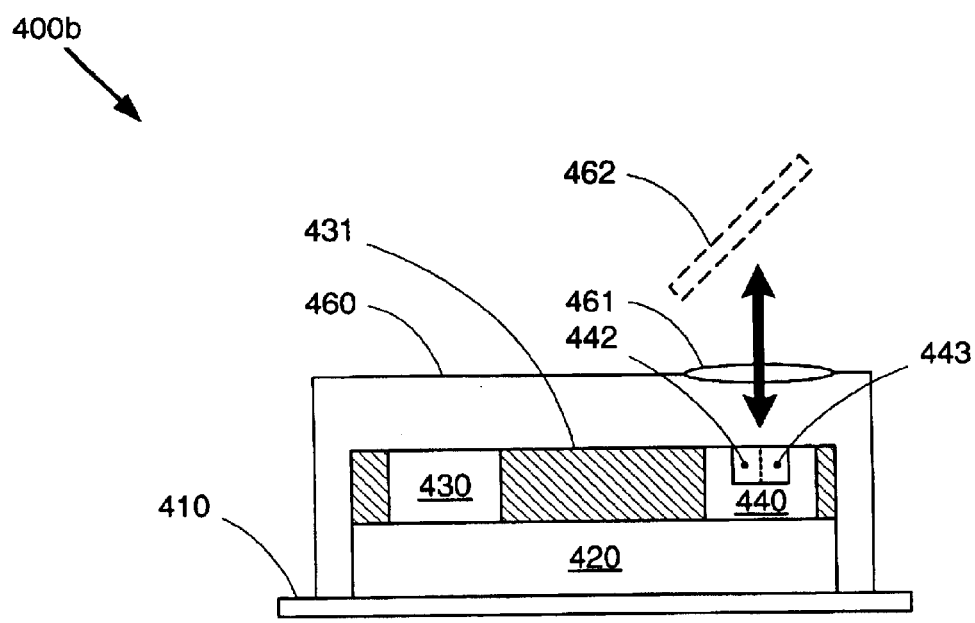

FIG. 4b shows an IC assembly 400b that is formed and operates in substantially the same manner as IC assembly 400a. IC assembly 400b comprises an IC 420 mounted on support structure 410, with SERDES 430 and opto-electronic converter 440 (with transmitter 442 and receiver 443) covalently bonded (for example, using the Enquist process) to IC 420 and surrounded by a thick oxide layer 431. However, rather than an optical fiber, IC assembly 400b includes an enclosure 460 that includes a transparent window 461. Window 461 is aligned with opto-electronic converter 440, and allows optical signals to be passed to and from opto-electronic converter 440, thereby providing a free space optical data link. An optional reflector 462 can be used to control the direction of the actual data path. Once again, IC assemblies 400a and 400b can be packaged using a flip-chip technique.

Figure 4C:
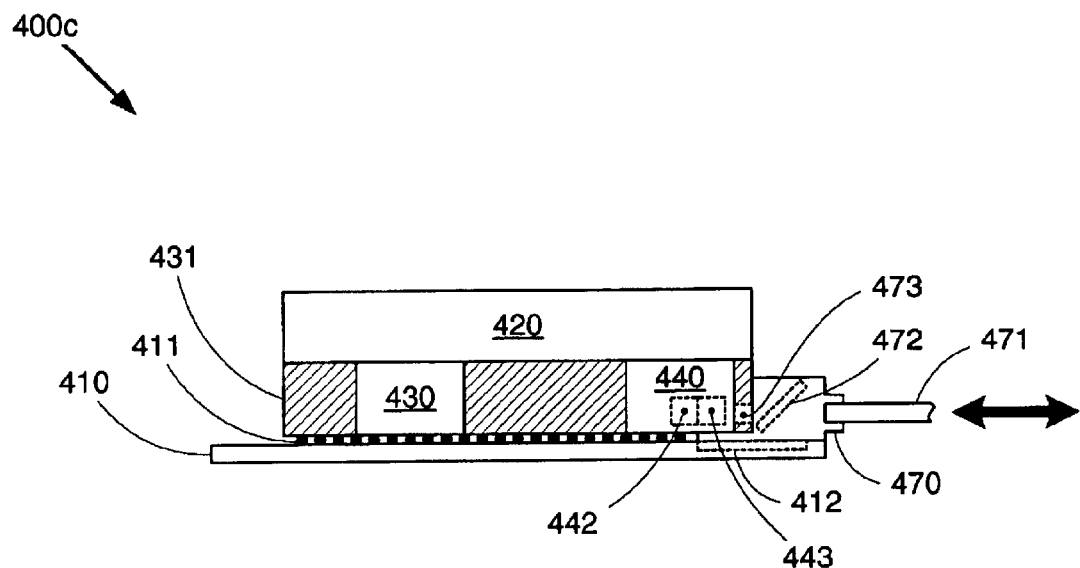

FIG. 4c shows an IC assembly 400c that incorporates an optical transceiver in accordance with another embodiment of the invention. IC assembly 400c is substantially similar to IC assembly 400a shown in FIG. 4a, but with the layered construction of opto-electronic converter 440, SERDES 430 and IC 420 flipped and installed onto support structure 410 via a plurality of solder balls 411 in a flip-chip configuration. Optical fiber 471 carries optical signals to and from IC assembly 400c, with fiber connector 470 taking one of a variety of forms depending on the technology used in opto-electronic converter 440 and the positioning of transmitter 442 and receiver 443. For example, an optional direct pathway 473 or optional focusing optics 472 can be used to properly direct the optical signals between opto-electronic converter 440 and optical fiber 471. An optional waveguide 412 mounted in support structure 410 can provide additional means for optical signal transmission.

Figure 4D:
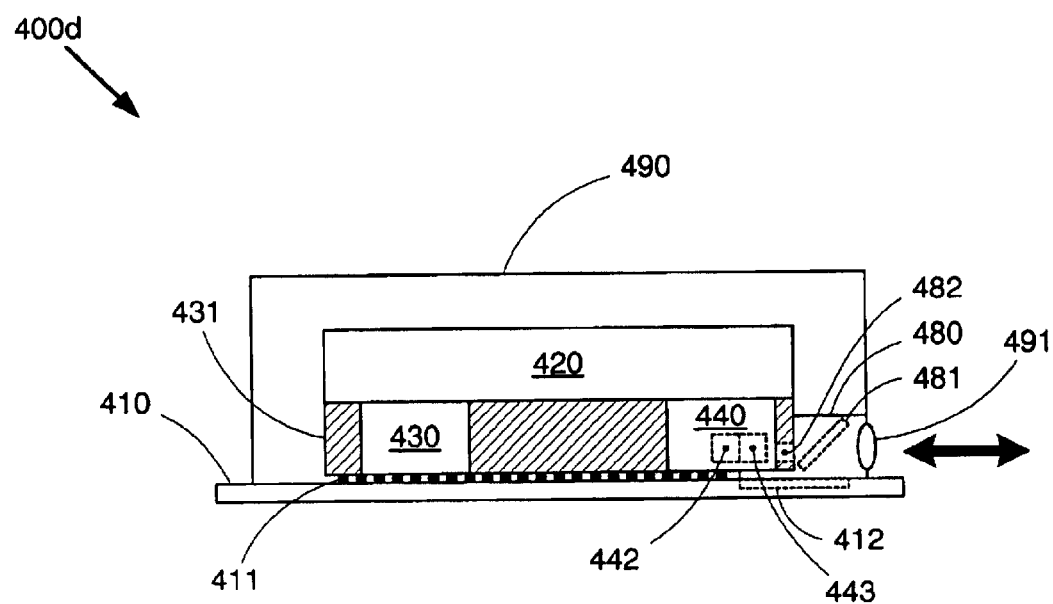

FIG. 4d shows an IC assembly 400d that incorporates an optical transceiver in accordance with another embodiment of the invention. IC assembly 400d is substantially similar to IC assembly 400b shown in FIG. 4b, but with the layered construction of opto-electronic converter 440, SERDES 430 and IC 420 flipped and installed onto support structure 410 via a plurality of solder balls 411 in a flip-chip configuration. A transparent window 462 in enclosure 460 allows free space optical signals to be transmitted to and from IC assembly 400d, with a transmission module 480 taking one of a variety of forms depending on the technology used in opto-electronic converter 440 and the positioning of transmitter 442 and receiver 443. For example, an optional direct pathway 482 or optional focusing optics 481 to properly direct the optical signals to and from opto-electronic converter 440. An optional optical waveguide 412 mounted in support structure 410 can provide additional means for optical signal transmission.

Figure 5A:
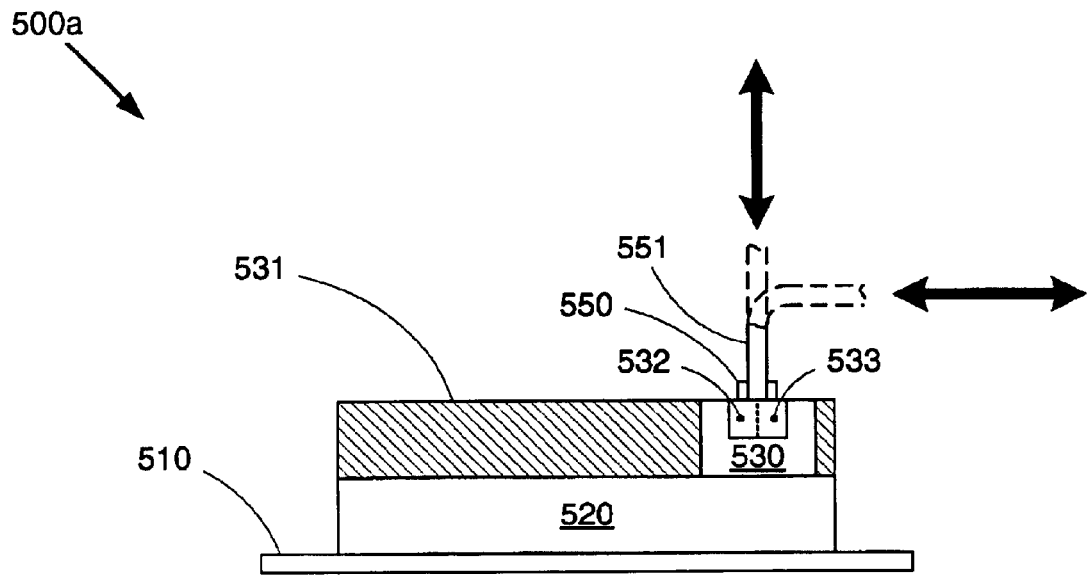

For even greater integration of the various optical transceiver components, the SERDES and opto-electronic converter can be formed using a common process technology. For example, the high-speed transistors of GaAs and InP processes are capable of meeting the performance demands of a SERDES. Therefore, a GaAs or InP process can be used to manufacture both the SERDES and a VCSEL/detector array. FIG. 5a shows an IC assembly 500a that includes an optical transceiver in accordance with another embodiment of the invention. IC assembly 500a comprises an IC 520 attached to a support structure 510. A combination SERDES-VCSEL/detector array 530 is covalently bonded to IC 520 and surrounded by a thick oxide layer 531. SERDES-VCSEL/detector array 530 includes a transmitter 532 and a receiver 533 for converting electrical signals to and from, respectively, optical signals. A fiber connector 550 on SERDES-VCSEL/detector array 530 mates with an optical fiber 551 to carry optical signals between SERDES-VCSEL/detector array 530 and any desired location. IC 520 can comprise any type of IC, such as a field programmable gate array (FPGA), a microprocessor, or a memory circuit, while support structure 510 can comprise any structure onto which IC 520 can be mounted, including a PCB or a standard chip package.

According to embodiments of the invention, SERDES-VCSEL/detector array 530 comprises a group III-V material, such as GaAs or InP, which allows both components (i.e., the SERDES and the VCSEL/detector array) to be produced by the same process technology while minimizing performance degradation. Also, the single-die construction minimizes any communications bandwidth degradation between the two components. Finally, the manufacturing process for IC assembly 500a is simplified because multiple covalent bonding and/or oxidation-planarization operations are not required.

To perform a data transmit operation, SERDES-VCSEL/detector array 530 serializes a parallel stream of data from IC 520 into a corresponding sequence of optical pulses that can be transmitted via optical fiber 551. As described with respect to FIG. 3a, the flexibility of optical fiber 551 allows for customized routing of the optical signals from SERDES-VCSEL/detector array 530. To perform a data receive operation, SERDES-VCSEL/detector array 530 reads and deserializes a sequence of pulses on optical fiber 551 and provides the resulting parallel data to IC 520. Thus, IC assembly 500a includes a highly manufacturable, high-speed optical transceiver.

Figure 5B:
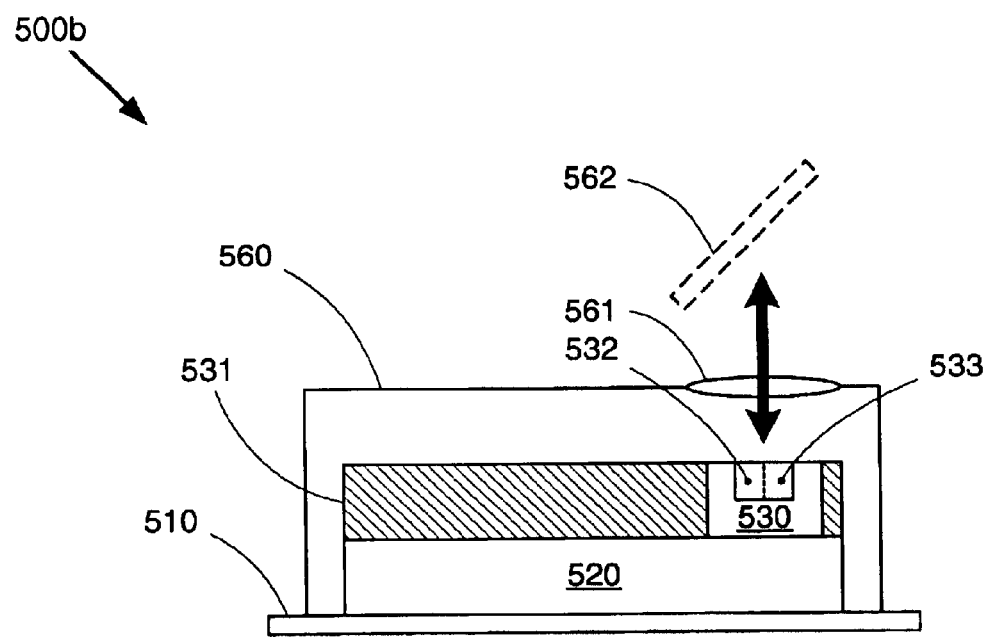
Figure 5C:
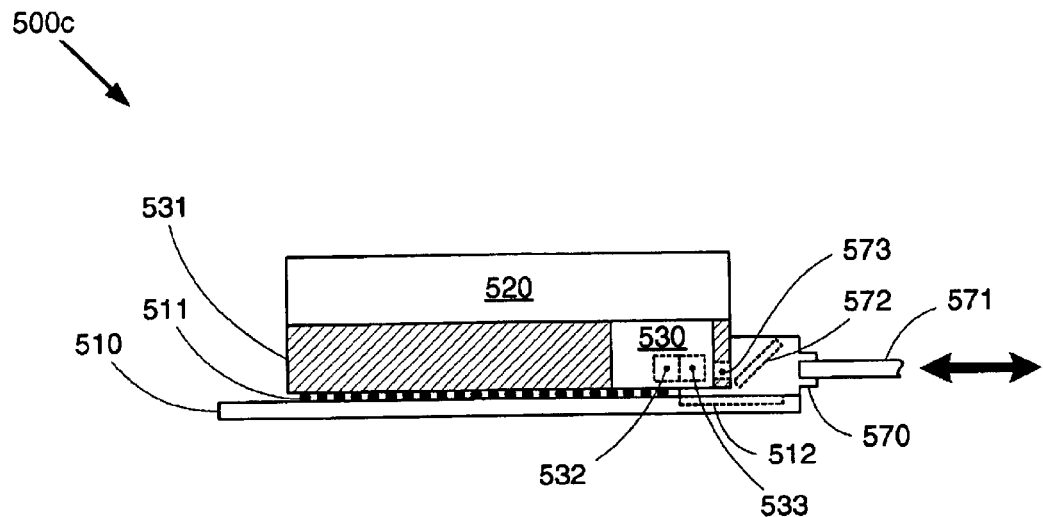

FIG. 5b shows an IC assembly 500b that is formed and operates in substantially the same manner as IC assembly 500a, except fiber connector 550 and optical fiber 551 are replaced with an enclosure 560 and a transparent window 561. Window 561 is aligned with a transmitter 532 and a receiver 533 in SERDES-VCSEL/detector array 530, and allows optical signals to be passed to and from IC assembly 500b, thereby providing a free space optical data link. An optional reflector 562 can be used to control the direction of the actual data path.

once again, IC assemblies 500*a* and 500*b* can be packaged using a flip-chip technique. FIG. 5*c* shows an IC assembly 500*c* that incorporates an optical transceiver in accordance with another embodiment of the invention. IC assembly 500*c* is substantially similar to IC assembly 500*a* shown in FIG. 5*a*, but with the layered construction of SERDES-VCSEL/detector array 530 and IC 520 flipped and installed onto support structure 510 via a plurality of solder balls 511 in a flip-chip configuration. Optical fiber 571 carries optical signals to and from IC assembly 500*c*, with fiber connector 570 taking one of a variety of forms depending on the technology used in SERDES-VCSEL/detector array 530 and the positioning of transmitter 532 and receiver 533. For example, an optional direct pathway 573 or optional focusing optics 572 can be used to properly direct the optical signals between SERDES-VCSEL/detector array 530 and optical fiber 571. An optional waveguide 512 mounted in support structure 510 can provide additional means for optical signal transmission.

Figure 5D:
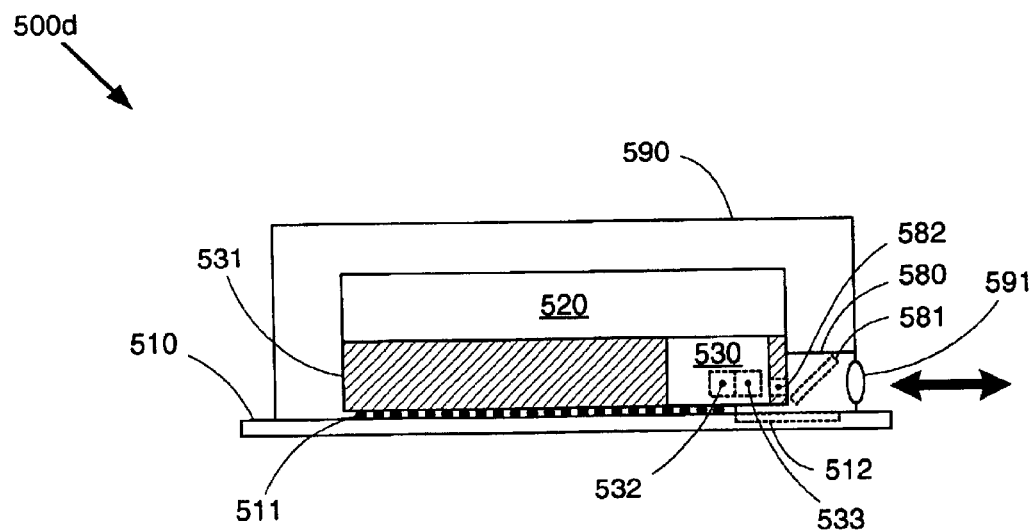

FIG. 5*d* shows an IC assembly 500*d* that incorporates an optical transceiver in accordance with another embodiment of the invention. IC assembly 500*d* is substantially similar to IC assembly 500*b* shown in FIG. 5*b*, but with the layered construction of SERDES-VCSEL/detector array 530 and IC 520 flipped and installed onto support structure 510 via a plurality of solder balls 511 in a flip-chip configuration. A transparent window 591 in an enclosure 590 allows free space optical signals to be transmitted to and from IC assembly 500*d*, with a transmission module 580 taking one of a variety of forms depending on the technology used in SERDES-VCSEL/detector array 530 and the positioning of transmitter 532 and receiver 533. For example, an optional direct pathway 582 or optional focusing optics 581 to properly direct the optical signals to and from SERDES-VCSEL/detector array 530. An optional optical waveguide 512 mounted in support structure 510 can provide additional means for optical signal transmission.

Although the present invention has been described in connection with several embodiments, it is understood that this invention is not limited to the embodiments disclosed, but is capable of various modifications that would be apparent to one of ordinary skill in the art. Thus, the invention is limited only by the following claims.

We claim:

1. An optical transceiver for an integrated circuit (IC), wherein the IC is formed in a first die, the optical transceiver comprising:

a serializer-deserializer (SERDES) formed in a second die, the second die being bonded onto the first die using a covalent bonding technique; and an opto-electronic converter for receiving output data from the SERDES and generating an output optical data stream and receiving an input optical data stream and providing input data to the SERDES.

2. The optical transceiver of claim 1, wherein a silicon process is used to manufacture the first die, and wherein a silicon germanium process is used to manufacture the second die.

3. The optical transceiver of claim 2, wherein the opto-electronic converter comprises a vertical cavity surface emitting laser (VCSEL).

4. The optical transceiver of claim 3, wherein the VCSEL is formed using a gallium arsenide process.

5. The optical transceiver of claim 3, wherein the VCSEL is formed using an indium phosphide process.

6. The optical transceiver of claim 1, wherein the opto-electronic converter includes an attachment location for an optical fiber.

7. The optical transceiver of claim 1, wherein the opto-electronic converter comprises;

a transmitter for generating the output optical data stream; and a receiver for receiving the input optical data stream, wherein the opto-electronic converter is contained in an enclosure, the enclosure comprising a transparent window aligned with the transmitter and the receiver.

8. The optical transceiver of claim 1, wherein the opto-electronic converter comprises:

a transmitter for generating the output optical data stream; and a receiver for receiving the input optical data stream, wherein the opto-electronic converter is contained in an enclosure, the enclosure comprising:

a transparent window; and transmission optics for guiding the output optical data stream and the input optical data stream between the opto-electronic converter and the transparent window.

9. The optical transceiver of claim 8, wherein the transmission optics comprises an optical waveguide.

10. The optical transceiver of claim 1, wherein the output data is transmitted from the SERDES to the opto-electronic converter along a flex interconnect, and wherein the input data is transmitted from the opto-electronic converter to the SERDES along the flex interconnect.

11. The optical transceiver of claim 10, the IC being mounted on a support structure using a flip-chip technique positioning the second die between the first die and the support structure, the opto-electronic converter directly contacting the flex interconnect.

12. The optical transceiver of claim 1, the IC being mounted on a support structure using a flip-chip technique positioning the second die between the first die and the support structure.

13. The optical transceiver of claim 1, wherein the opto-electronic converter is formed in a third die, the third die being bonded onto the second die using the covalent bonding technique.

14. The optical transceiver of claim 1, wherein the opto-electronic converter is formed in a third die, the third die being bonded onto the first die using the covalent bonding technique.

15. The optical transceiver of claim 1, wherein the opto-electronic converter is formed in the second die.

16. The optical transceiver of claim 15, wherein the opto-electronic converter comprises a vertical cavity surface emitting laser (VCSEL), and wherein a gallium arsenide process is used to manufacture the second die.

17. The optical transceiver of claim 15, wherein the opto-electronic converter comprises a vertical cavity surface emitting laser (VCSEL), and wherein an indium phosphide process is used to manufacture the second die.

18. A method for manufacturing an optical transceiver, the method comprising:

covalently bonding a serializer-deserializer (SERDES) die to an integrated circuit (IC) die;

forming a first oxide layer over the SERDES die and the IC die; and planarizing the first oxide layer to expose the SERDES die.

19. The method of claim 18, wherein covalently bonding the SERDES die to the IC die comprises: processing the IC die up to a first metal layer;

planarizing the first metal layer;

planarizing a first surface of the SERDES die; and placing the first surface of the SERDES die on the first metal layer.

20. The method of claim 18, wherein covalently bonding the SERDES die to the IC die comprises bonding the SERDES die to the IC die using an Enquist process.

21. The method of claim 18, wherein the IC die comprises a silicon die and the SERDES die comprises a silicon germanium die.

22. The method of claim 18, further comprising:

covalently bonding an opto-electronic converter die onto the SERDES die;

forming a second oxide layer over the opto-electronic converter die, the first oxide layer, and the SERDES die; and planarizing the second oxide layer to expose the opto-electronic converter die.

23. The method of claim 22, wherein the IC die comprises a silicon die, wherein the SERDES die comprises a group IV material, and wherein the opto-electronic converter die comprises a group III–V material die.

24. The method of claim 23, wherein the group IV material is silicon germanium, and wherein the group III–V material is gallium arsenide.

25. The method of claim 23, wherein the group IV material is silicon germanium, and wherein the group III–V material is indium phosphide.

26. The method of claim 18, further comprising covalently bonding an opto-electronic converter die onto the IC die, wherein second oxide layer is formed over the opto-electronic converter die, and wherein planarizing the first oxide layer exposes the opto-electronic converter die.

27. The method of claim 18, further comprising forming a vertical cavity surface emitting laser (VCSEL) and a detector array in the SERDES die.

28. The method of claim 27, wherein the SERDES die comprises gallium arsenide.

29. The method of claim 27, wherein the SERDES die comprises indium phosphide.

30. An integrated circuit (IC) assembly comprising:

an IC;

a serializer-deserializer (SERDES) for converting parallel output data from the IC into serial output data, the SERDES being covalently bonded to the IC;

means for converting the serial output data into an output optical data stream; and means for converting an input optical data stream into serial input data for the SERDES.

31. The IC assembly of claim 30, wherein the IC comprises a field programmable logic array.

32. The IC assembly of claim 30, wherein the IC comprises a microprocessor.

33. The IC assembly of claim 30, wherein the IC comprises a memory module.

34. The IC assembly of claim 30, wherein the means for converting the serial output data into an output optical data stream comprises a vertical cavity surface emitting laser (VCSEL).

35. The IC assembly of claim 34, wherein the means for converting the input optical data stream into a serial input comprises an optical detector array.

36. The IC assembly of claim 35, wherein the VCSEL and the optical detector array are covalently bonded to the SERDES.

37. The IC assembly of claim 35, wherein the VCSEL and the optical detector array are covalently bonded to the IC.

38. The IC assembly of claim 35, wherein the SERDES, the VCSEL, and the optical detector array are formed in a single die.

39. The IC assembly of claim 30, further comprising a fiber connector for attaching an optical fiber to carry the output optical data stream and the input optical data stream.

40. The IC assembly of claim 30, further comprising a support structure enclosing the IC and SERDES, the support structure comprising a transparent window for transmitting the input optical data stream and the output optical data stream to and from, respectively, the IC assembly.

41. The IC assembly of claim 40, the transparent window being aligned with the means for converting the serial output data and the means for converting the input optical data stream.

42. The IC assembly of claim 40, further comprising transmission optics for guiding the output optical data stream from the means for converting the serial output data to the transparent window and for guiding the input optical data stream from the transparent window to the means for converting the input optical data stream.

43. The IC assembly of claim 42, wherein the transmission optics comprises an optical waveguide.

44. The IC assembly of claim 40, further comprising a reflector outside the support structure for redirecting the output optical data stream and the input optical data stream.

45. The IC assembly of claim 30, the IC being mounted on a mounting surface of a support structure in a flip-chip configuration, the SERDES being positioned between the IC and the mounting surface.

* * * * *